(12) United States Patent
Barile et al.

(10) Patent No.: US 8,799,287 B1
(45) Date of Patent: Aug. 5, 2014

(54) METHOD AND APPARATUS FOR CATEGORIZING DOCUMENTS CONTAINING SENSITIVE INFORMATION

(75) Inventors: Ian Barile, Mountain View, CA (US); Aleksey Tsibulya, San Rafael, CA (US)

(73) Assignee: Symantec Corporation, Mountain View, CA (US)

( * ) Notice: Subject to any disclaimer, the term of this patent is extended or adjusted under 35 U.S.C. 154(b) by 704 days.

(21) Appl. No.: 12/755,299

(22) Filed: Apr. 6, 2010

(51) Int. Cl.
*G06F 7/00* (2006.01)
*G06F 17/30* (2006.01)

(52) U.S. Cl.
USPC .......................................................... 707/738

(58) Field of Classification Search
CPC ............................................... G06F 17/30707
USPC ..................... 707/690, 694, 737, 738, 740
See application file for complete search history.

(56) References Cited

U.S. PATENT DOCUMENTS

| | | | |
|---|---|---|---|
| 5,633,999 A * | 5/1997 | Clowes et al. ............... | 714/6.21 |
| 6,006,308 A * | 12/1999 | Matsunami et al. .......... | 711/114 |
| 6,516,425 B1 * | 2/2003 | Belhadj et al. ............... | 714/6.12 |
| 7,577,689 B1 * | 8/2009 | Masinter et al. ...................... | 1/1 |
| 2003/0126136 A1 * | 7/2003 | Omoigui .......................... | 707/10 |
| 2005/0120024 A1 * | 6/2005 | Tharpe et al. .................... | 707/10 |
| 2007/0047006 A1 * | 3/2007 | Sakai ............................. | 358/400 |
| 2007/0094268 A1 * | 4/2007 | Tabe ................................ | 707/10 |
| 2008/0243842 A1 * | 10/2008 | Liang et al. ....................... | 707/6 |
| 2009/0158430 A1 * | 6/2009 | Borders .......................... | 726/23 |
| 2009/0254572 A1 * | 10/2009 | Redlich et al. .................. | 707/10 |
| 2010/0161830 A1 * | 6/2010 | Noy et al. ...................... | 709/234 |
| 2010/0250497 A1 * | 9/2010 | Redlich et al. ................ | 707/661 |
| 2010/0251011 A1 * | 9/2010 | Takagi et al. ..................... | 714/6 |
| 2011/0087653 A1 * | 4/2011 | Stork et al. ..................... | 707/723 |
| 2011/0087744 A1 * | 4/2011 | Deluca et al. ................. | 709/206 |
| 2011/0202756 A1 * | 8/2011 | West ............................. | 713/152 |

\* cited by examiner

*Primary Examiner* — Rehana Perveen
*Assistant Examiner* — Mark E Hershley
(74) *Attorney, Agent, or Firm* — Lowenstein Sandler LLP

(57) ABSTRACT

A method and apparatus for determining whether a document is to be protected is described. In one embodiment, a computer system identifies a document to be categorized. The computer system then determines one or more probabilities that the document belongs to one or more of a plurality of predefined categories, the probabilities based on profiles of the predefined categories. The computer system then determines whether the probabilities indicate that the document is to be protected, and, if the document is to be protected, causes the document to be used in data loss detection.

20 Claims, 7 Drawing Sheets

METHOD AND APPARATUS FOR CATEGORIZING DOCUMENTS CONTAINING SENSITIVE INFORMATION

FIELD OF INVENTION

Embodiments of the invention relate to the field of processing data, and more particularly, to categorizing documents to prevent loss of sensitive data.

BACKGROUND OF THE INVENTION

Data Loss Prevention (DLP) involves computer and information security, where DLP systems identify, monitor, and protect data in use (e.g., endpoint actions), data in motion (e.g., network actions), and data at rest (e.g., data storage). Typically, a DLP system creates fingerprints of sensitive information that requires protection, and then uses the fingerprints to detect the presence of sensitive information in various files, messages and the like. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, etc.

In order to effectively prevent the loss of sensitive information, it is important to identify whether newly introduced documents contain sensitive information that needs to be protected. However, current DLP solutions are unable to effectively classify newly introduced documents that do not exactly match an existing protected document profile.

SUMMARY OF THE INVENTION

A method and apparatus for determining whether a document is to be protected is described. In an exemplary method of one embodiment, a computer system identifies a document to be categorized. The computer system then determines one or more probabilities that the document belongs to one or more of a plurality of predefined categories, the probabilities based on profiles of the predefined categories. The computer system then determines whether the probabilities indicate that the document is to be protected, and, if the document is to be protected, causes the document to be used in data loss detection.

In some embodiments, the computer system receives context data pertaining to the document and confirms whether the document is to be protected using the context data. In some embodiments, the context data includes at least one of sender data, recipient data, document author data, and document viewer data.

In some embodiments, the method includes identifying a plurality of documents, each document in the plurality of documents being associated with at least one of the plurality of predefined categories and creating a profile for each of the plurality of predefined categories using the plurality of documents. In some embodiments, determining whether the probabilities indicate that the document is to be protected includes determining whether at least one of the one or more probabilities exceeds a threshold accuracy value.

In some embodiments, the exemplary method includes analyzing dissemination of the document and graphically illustrating the dissemination. In some embodiments, analyzing the dissemination of the document includes determining an origin of the document and a timestamp associated with the origin, identifying entities that accessed the document and timestamps associated with the accesses, determining whether an originator of the document and the entities that accessed the document are authorized to have access to the document, and identifying entities that have the ability to access the document. In some embodiments, graphically illustrating the dissemination comprises graphically indicating whether the originator and the entities that accessed the document were authorized and adding the entities that have the ability to access the document to the illustration of the dissemination.

In addition, a computer readable storage medium for determining whether a document is to be protected is described. An exemplary computer readable storage medium provides instructions, which when executed on a processing system causes the processing system to perform a method such as the exemplary methods discussed above.

Further, a system for determining whether a document is to be protected is described. An exemplary system may include a memory and a processor coupled with the memory. In some embodiments of the exemplary system, the processor is to identify a document to be categorized, determine one or more probabilities that the document belongs to one or more of a plurality of predefined categories, the probabilities based on profiles of the predefined categories, determine whether the probabilities indicate that the document is to be protected, and if the document is to be protected, cause the document to be used in data loss detection.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
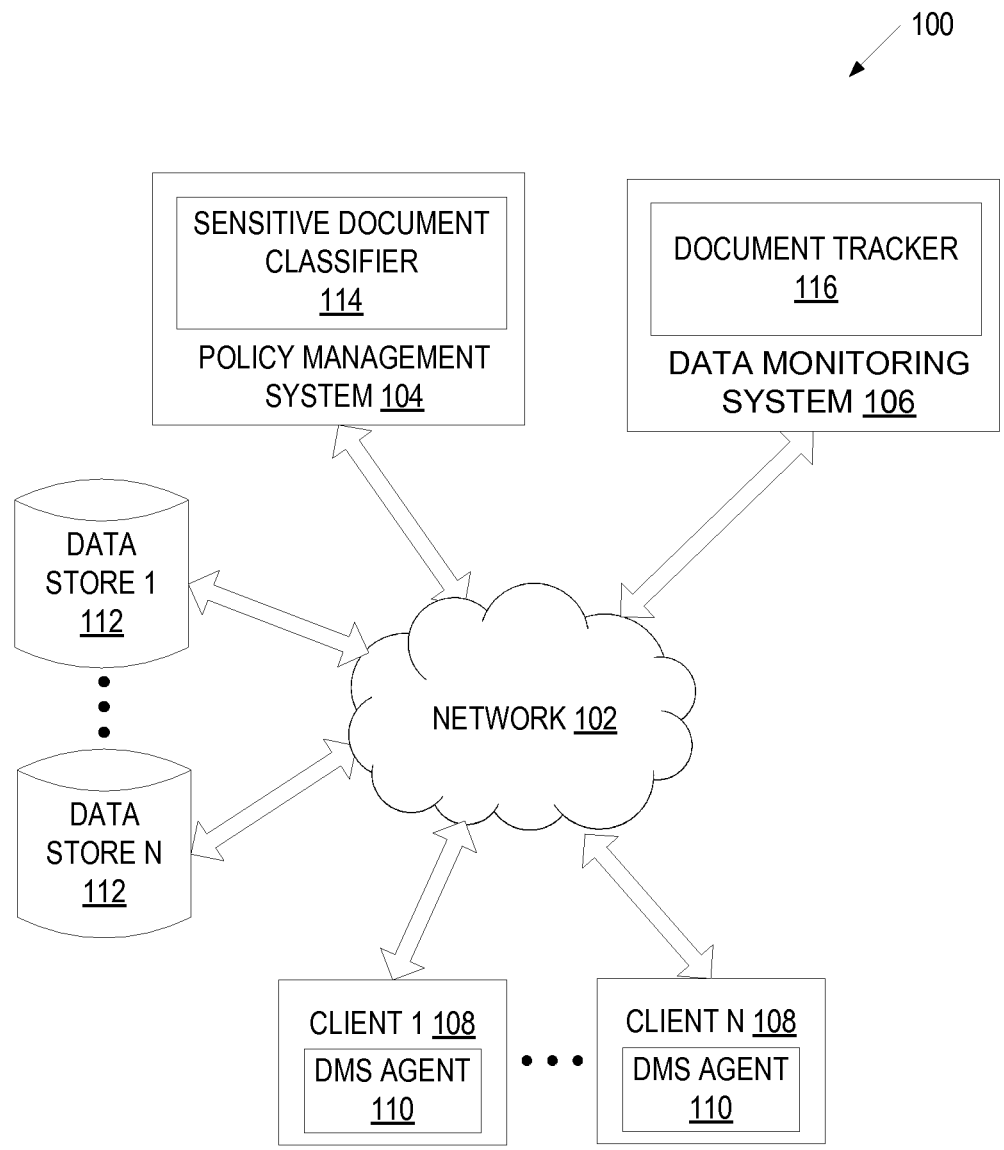
FIG. 1 is a block diagram of exemplary network architecture in which embodiments of the invention may operate.

A method and apparatus for determining whether a document is to be protected is described. In one embodiment, a computer system identifies a document to be categorized. The computer system then determines one or more probabilities that the document belongs to predefined categories. The probabilities are determined based on document profiles associated with the predefined categories. The computer system then determines whether the probabilities indicate that the document should be protected, and, if the document should be protected, causes the document to be used in data loss detection.

Embodiments of the present invention provide a DLP system that determines whether a document contains sensitive information by calculating a probability that the document belongs to a category of documents that are to be protected. As a result, documents that may not be an exact match to a protection profile but still contain sensitive information are nonetheless effectively categorized and protected.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary network architecture 100 in which embodiments of the invention may operate. The network architecture 100 may include a policy management system (PMS) 104, a data monitoring system (DMS) 106, and user devices 108 coupled via a network 102 (e.g., public network such as the Internet or private network such as a local area network (LAN)). The user devices 108 may include personal computers, laptops, PDAs, mobile phones, network appliances, etc.

The PMS 104 and the DMS 106 may reside on the same or different machines (e.g., a server computer system, a gateway, a personal computer, etc.). They may run on one Local Area Network (LAN) and may be incorporated into the same physical or logical system, or different physical or logical systems.

Alternatively, the PMS 104, DMS 106, and user devices 108 may reside on different LANs that may be coupled together via the Internet but separated by firewalls, routers, and/or other network devices. In yet another configuration, the PMS 104 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The network architecture 100 further includes data stores 112 coupled to the network 102. The data stores 112 may represent a single or multiple data structures (databases, repositories, files, etc.) residing on one or more mass storage devices, such as magnetic or optical storage based disks, tapes or hard drives. The data stores 112 may store any kind of data pertaining to the operation of an organization including emails, shared workspaces, etc.

The PMS 104 is responsible for receiving parameters pertaining to data loss prevention (DLP) policies, such as preconfigured template policies or customized policies, and creating policies based on these parameters. In one embodiment, the PMS 104 receives the policy parameters via a policy definition graphical user interface (not shown). In another embodiment, the PMS 104 receives the policy parameters from an Application Programming Interface (API) or via a configuration file formatted in text or a defined data format (e.g., extensible markup language (XML) or binary format). In one embodiment, a policy specifies source data that should be protected from unauthorized transmission, access or any other use. The source data may include structured data stored in databases or other tabular formats. Such structured source data may consist of, for example, customer, employee, patient or pricing information. Alternatively, the source data may include unstructured data stored in documents from file systems or other document repositories. Such unstructured source data may include design plans, source code, CAD drawings, financial reports, and any other sensitive (e.g., confidential or proprietary) information stored in documents.

A policy may include a set of rules that specify which actions should be taken when content being monitored contains sensitive information. Sensitive information may include corporate mergers and acquisitions information, human resources information, government (e.g. Securities and Exchange Commission) filings and any other content that requires restricted user access. The content being monitored may represent, for example, transmitted content (e.g., an email message or attachment, a web mail message or attachment, etc.), content generated by an application, or content stored in databases, caches, etc. If content being monitored contains sensitive information, the policy may require that transmission of the content be blocked, reported, re-routed, etc. or that access to the content be blocked, reported, etc.

In one embodiment, the DMS 106 monitors traffic to detect sensitive information. The DMS 106 may detect messages (e.g., sent email messages, instant messages, text messages, and/or other documents according to a configuration of the DMS 106) containing sensitive information using fingerprints of the sensitive information such as fingerprints of sensitive documents from file systems or other document repositories (e.g., design plans, source code, CAD drawings, financial reports, and any other sensitive or proprietary information stored in documents), or fingerprints of sensitive information stored in a database (e.g., customer, employee, patient or pricing information). The use of fingerprints allows the DMS 106 to accurately detect sensitive information in messages transmitted over network 102. The user devices 108 may store DMS agents 110 that prevent loss of data stored locally on the user devices 108 using fingerprints of sensitive information received from the PMS 104.

In one embodiment, the DMS 106 and the DMS agents 110 use fingerprints of documents that a sensitive document classifier 114 has determined need to be protected because they contain sensitive information. In particular, during monitoring, the DMS 106 may identify new documents (e.g., emails, email attachments, documents added to a central repository, documents copied to a client's hard drive, etc.) that have not been previously categorized and provide these documents to the PMS 104 for categorization. In particular, the PMS 104 may include a sensitive document classifier 114 that categorizes newly-identified documents and determines whether or not they need to be protected. In another embodiment, the sensitive document classifier 114 may be part of the DMS 106. The documents may be single documents or an entire repository of documents that may contain sensitive information.

In one embodiment, the DMS 106 also includes a document tracker 116. Document tracker 116 may analyze the dissemination of sensitive documents. The document tracker 116 may also graphically illustrate (e.g., in a user interface or a report) the dissemination of these sensitive documents. In one embodiment, these documents may be documents that the sensitive document classifier 114 has determined need to be protected.

Figure 2:
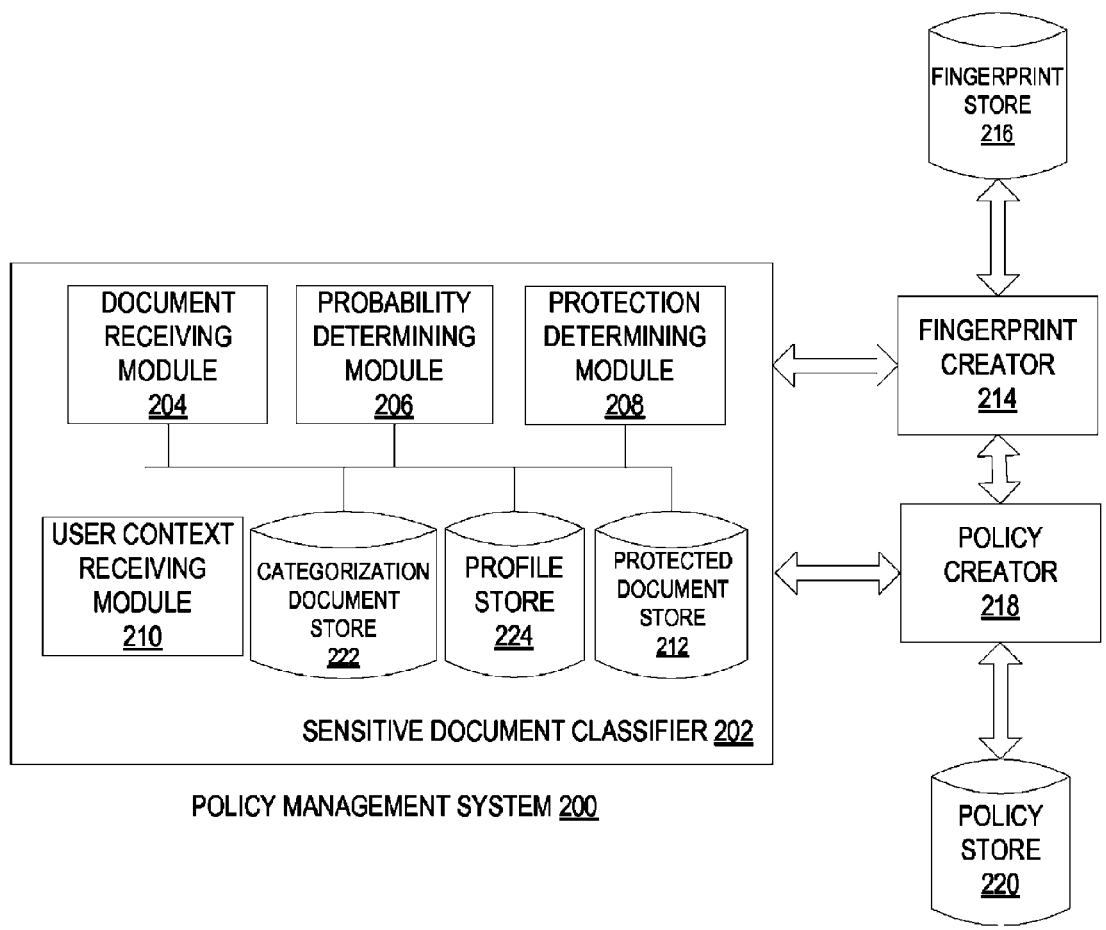
FIG. 2 is a block diagram of one embodiment of a policy management system.

FIG. 2 is a block diagram of one embodiment of a Policy Management System (PMS) 200. The PMS 200 may include a sensitive document classifier 202, a fingerprint creator 214, a fingerprint store 216, a policy creator 218, and a policy store 220.

The sensitive document classifier 202 may include a document receiving module 204, a probability determining module 206, a protection determining module 208, a user context receiving module 210, a protected document store 212, a categorization document store 222, and a profile store 224.

The document receiving module 204 may receive newly identified documents that have yet to be categorized. In one embodiment, the newly identified documents are part of data in motion (network traffic) or data at rest (data storage such as data stores 112 of FIG. 1) monitored by a data monitoring system such as the DMS 106 of FIG. 1 and sent to the PMS 200 for categorization. Alternatively, the newly identified documents are part of data in use (endpoint actions) monitored by DLP agents 110 of user devices 108 in FIG. 1 and sent to the PMS 200 for categorization. The documents to be categorized may be a single document (e.g., a single email message or attachment) or they may be a collection of documents (e.g., an entire email repository).

Probability determining module 206 determines one or more probabilities that the document belongs to one or more predefined categories. In one embodiment, this is done using machine learning detection (MLD). In this embodiment, a corpus of existing documents is identified for use in categorizing newly identified documents. The corpus of documents may be stored in categorization document store 222. Each document in the corpus may be associated with at least one predefined category. Categories of documents may include legal documents, human resources documents, source code documents, etc. The documents comprising the corpus of documents and the categories those documents are classified into may be chosen based on the data loss prevention needs of an organization. For instance, a software company may define source code documents as a protected category, whereas a health insurance company may define a category for medical documents. Each document in the corpus may be classified as belonging to more than one category of documents. For example, a single document (such as an employment contract) may be categorized as both a legal document and a human resources document. The corpus of documents may also include negative documents. Such documents are marked as not belonging to one or more categories of documents that the organization has decided it wants to protect. For example, a source code document may be included in the corpus of documents and marked as not being a legal document. Using this corpus of documents, the probability determining module 206 can create a profile for each of the multiple predefined categories. The created profiles may be stored in profile store 224. As new documents are added to the corpus of existing documents, the profiles of different categories may be updated, allowing for more accurate categorization results.

The probability determining module 206 may use the created profiles to determine probabilities that new documents belong to particular categories. Each new document may be defined as potentially belonging to multiple categories. In one example, a new document may be determined to have a 90% chance of being a legal document, an 80% chance of being a human resources document, and a 1% chance of being a source code document based on the created profiles.

User context module 210 may receive user context information associated with the received documents. In one embodiment, the user context module 210 receives data identifying at least one of a sender and a recipient of a document, such as an email message. In the case of a document that is stored in a centralized data store, the user context data may include information about the author of the document as well as information about the user currently viewing the document. In the case of an endpoint action (e.g., copying a document from one location to another, printing a document from a server, etc.), the user context data may include information about the author of the document, information about the user performing the endpoint operation, and information about the owner of the device used to perform the endpoint operation.

In one embodiment, the user context information includes a group that at least one of a sender and a recipient of a document belong to. For example, an employee in the human resources department may be placed in an HR group while an attorney (whether employed by an organization or serving as outside counsel to the organization) may be placed in a Legal group.

Protection determining module 208 may determine whether received documents are to be protected. In one embodiment, this determination is based on the one or more probabilities assigned to the document by the probability determining module 206. The organization may set a threshold accuracy value that a probability must exceed for a document to be protected. If the probability, as determined by the probability determining module, that the received document is in one or more categories that the organization feels need to be protected exceeds the threshold, the determination is made that the received document should be protected. For example, a medical insurer may decide that medical documents and legal documents should be protected, and may set their threshold value at 90%. Then, if a received document is classified as having a 95% chance of being a medical document and an 85% chance of being a legal document, the document is protected. A document classified as having a 10% chance of being a medical document and a 95% chance of being a legal document is also protected, but a document classified as having a 10% of being a medical document and a 50% chance of being a legal document is not.

In another embodiment, the determination is made based on both the determined probabilities and the user context information received by the user context module 210. A document that does not meet the threshold requirements established by the organization may still be protected if it is sent from or received by a particular user. For example, a document sent to or from the CEO of an organization may be protected even though none of the one or more determined probabilities exceed the set threshold value. In one embodiment, documents sent from or received by a particular user have a lower threshold requirement than for other users if communications by that user are more likely to contain sensitive information. In yet another embodiment, a received document is protected based in part on being sent to or from a user belonging to a certain group of users. For instance, in a software company, if a probability that a document is a legal document exceeds a set threshold value and the document is being sent by an employee belonging to a legal department group, the document may be deemed to be protected because the fact that the document originated from the legal department confirms the determined probability. Alternatively, if the recipients of this document are employees belonging to a software development group, the document may not be deemed protected because software developers rarely receive legal documents and the classification that the document has a very good chance of being a legal document is likely a false positive and may have been triggered by, for example, a copyright notice in the source code.

If the determination is made that a received document is to be protected, it may be used to by the DMS 106 in monitoring traffic for sensitive information. In one embodiment, this requires the document to be added to a protected document store 212. Alternatively, a fingerprint of the document to be protected may be created by a fingerprint creator 214 and stored in a fingerprint store 216.

The protection of a particular document may require a change in a data loss prevention (DLP) policy of the organization. A DLP policy may be created based on regulations concerning handling of sensitive information maintained by an organization, or based on corporate data governance rules. A policy may include a set of rules that specify which information should be present in a document and/or which properties a document should have to trigger a violation. For example, a new policy may need to be created for a specific document that has been categorized as sensitive. If a new DLP policy is to be created, this may be done by policy creator 218, and the policy may be stored in policy store 220. Alternatively, a document newly categorized as sensitive may be added to a collection of sensitive documents that is already covered by an existing policy (e.g., an existing policy that triggers a violation if content being monitored includes any document (or a portion of any document) from the collection of documents).

Figure 3:
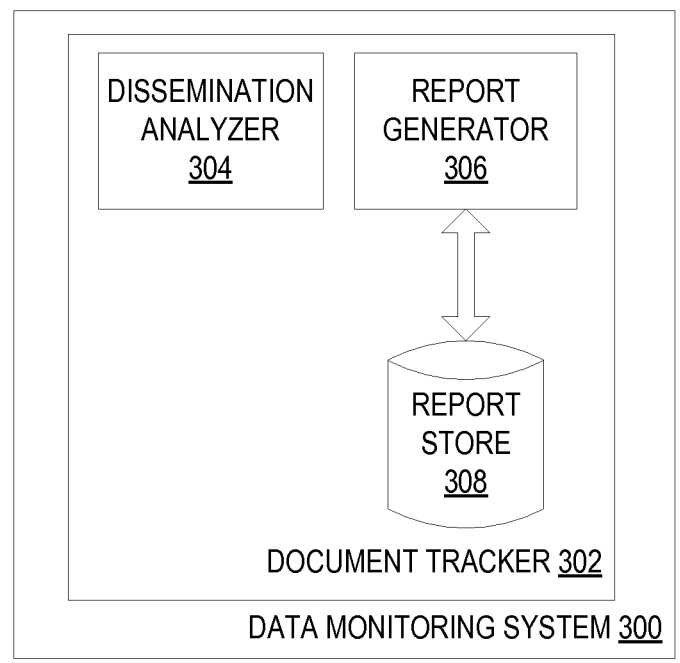
FIG. 3 is a block diagram of one embodiment of a document monitoring system.

FIG. 3 is a block diagram of one embodiment of a Data Monitoring System (DMS) 300. The DMS 300 may contain a document tracker 302, a dissemination analyzer 304, a report generator 306, and a report store 308.

Document tracker 302 may analyze the dissemination of protected documents within an organization or multiple partnering organizations. In one embodiment, this may be done by dissemination analyzer 304. In order to do this, the dissemination analyzer 304 may need to determine the origin of a protected document and a timestamp of when the origin occurred. The origin of a protected document may be the creation of the document within the organization or, in the case of an externally created document, when the document was first received within the organization. The origin may be defined by an entity that created or first sent or received the document, and the machine where this event occurred. The dissemination analyzer 304 may also identify any and all entities that have accessed the document since its origin, and the timestamps for when the access occurred. For example, if the document is an email message, the dissemination analyzer 304 may determine the initial user within the organization that sent or received the email, and what time this initial event occurred. It may also determine all other users to whom the message was forwarded and what time they received the forwarded message. The dissemination analyzer 304 may also determine whether the originator and the other entities that have accessed the document are authorized to have access to the document as well as identify entities, both authorized and unauthorized, that currently have the ability to access the document.

Figure 6:
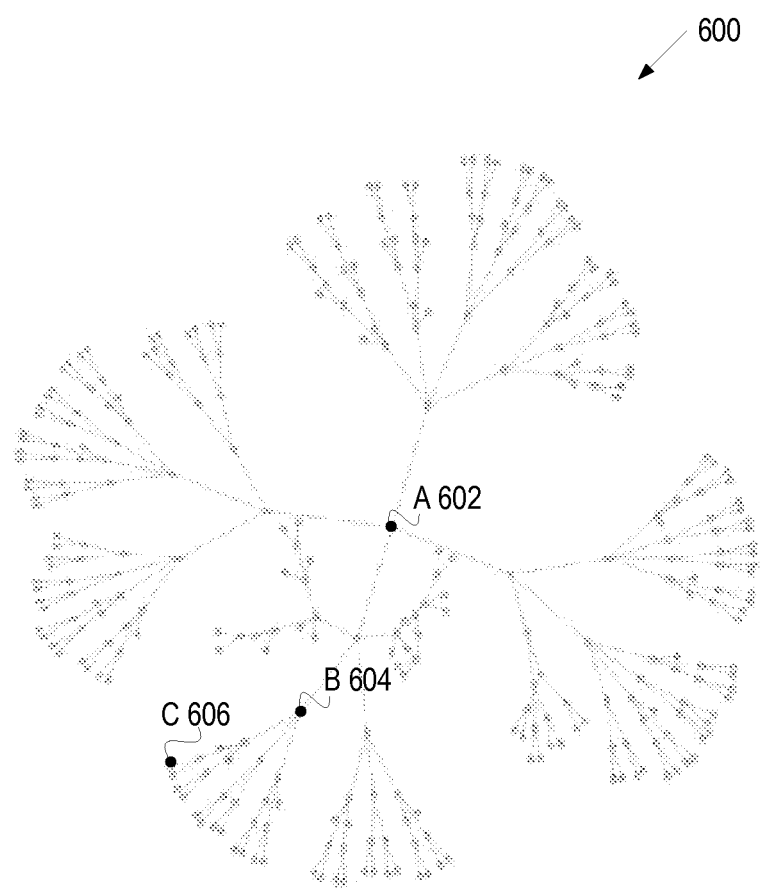
FIG. 6 is an exemplary graphical representation of the dissemination of a document, in accordance with one embodiment of the invention.

Document tracker 302 may also graphically illustrate this dissemination. In one embodiment, this is done by report generator 306. Reports generated by report generator 306 may be stored in a report store 308. Alternatively, the graphs may be generated using a graphical user interface (not shown). An exemplary graphical illustration of the dissemination of a document is shown in FIG. 6.

Figure 4:
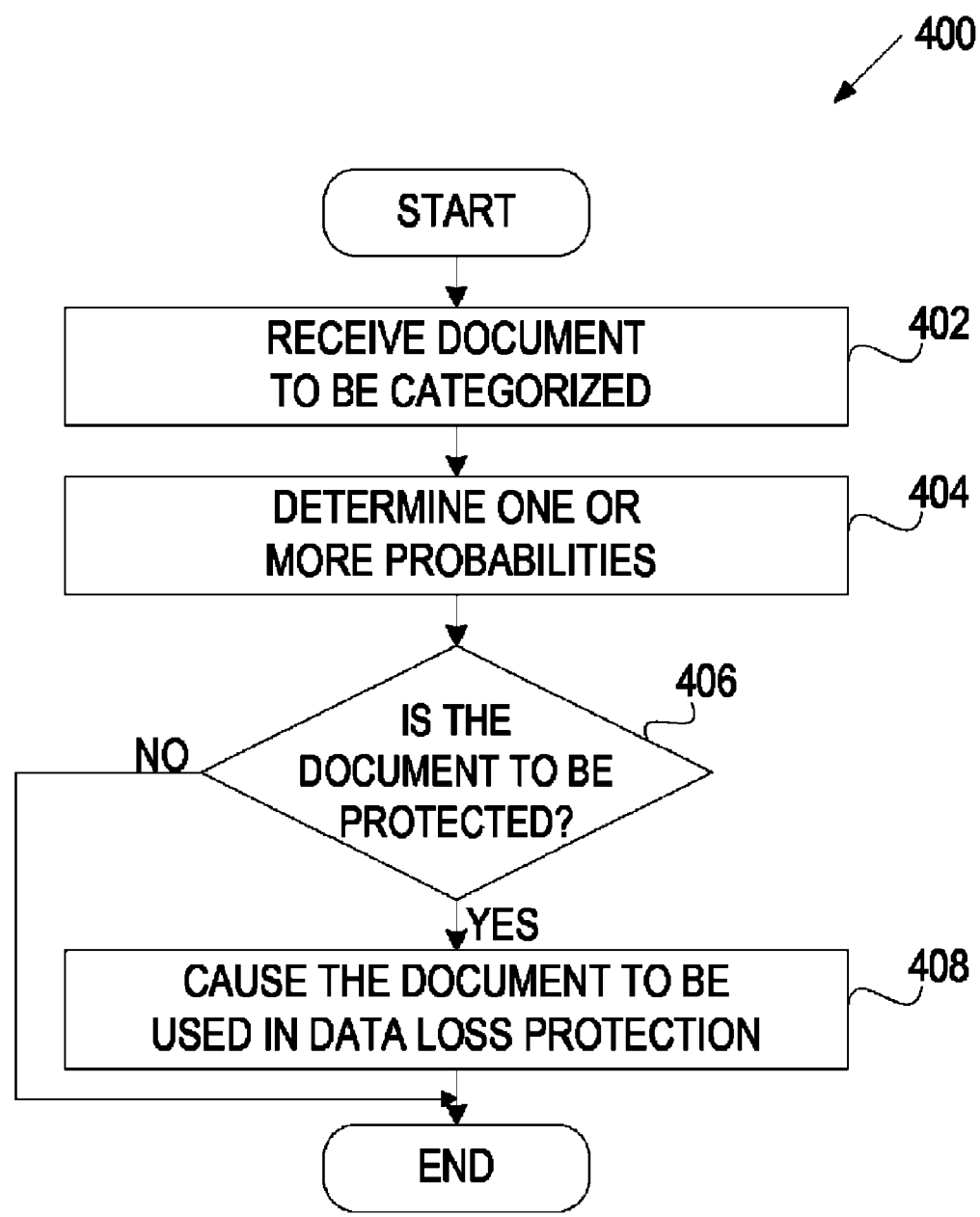
FIG. 4 is a flow diagram of one embodiment of a method for determining whether a document is to be protected.

FIG. 4 is a flow diagram of one embodiment of a method 400 for identifying documents that need to be protected. The method 400 is performed by processing logic that may comprise hardware (circuitry, dedicated logic, etc.), software (such as is run on a general purpose computer system or a dedicated machine), or a combination of both. In one embodiment, the method 400 is performed by a classifier (e.g., sensitive document classifier 114).

Referring to FIG. 4, processing logic begins by receiving a document to be categorized (block 402). The received document may be a single document, such as en email, or may be one of a collection of documents, such as one email out of an email repository. The document may come from a data store or a client device. Alternatively, it may have been identified as a document needing categorization by a data monitoring system when monitoring network traffic.

At block 404, processing logic determines one or more probabilities that the document belongs to one or more predefined categories of documents that are to be protected. In one embodiment, this is done using a machine learning detection (MLD) technique. Using MLD, the received document is compared to profiles of the predetermined categories. These profiles may be formed from a corpus of documents that have already been associated with the predetermined categories and, in some embodiments, documents that are known not to belong to any of the predetermined categories (negative documents). The corpus of identified documents may be selected by an administrator within the organization and may be representative of the predefined categories of documents that the organization would like to protect. Each document in the corpus of documents may be identified as belonging to one or more of the categories of documents. Using the identified corpus of documents, a profile may be created for each of the predefined categories, and the received document can be compared to the profiles to identify the probability that the document belongs to one or more of the predefined categories. For instance, a received document may be determined to have a 90% chance of being a legal document, an 80% chance of being a human resources document, and a 1% chance of being a source code document. As new documents are added to the corpus of existing documents, the profiles of different categories may be updated, allowing for more accurate categorization results.

At block 406, processing logic determines whether the received document is to be protected. In one embodiment, this determination is made based at least in part on the probabilities assigned to the document at block 404. The system administrator of an organization may set a threshold value, and any document whose chances of belonging to one or more of the predefined categories of documents exceeds the threshold value is determined to require protection. For example, if an organization has determined that legal documents and source code documents are categories of documents that need to be protected, and has set their threshold at 80%, a document has been determined to have a 5% chance of being a source code document and a 90% chance of being a legal document would be protected but a document that has been determined to have a 75% chance of being a source code document and a 25% chance of being a legal document would not be protected. The threshold value may be configurable (e.g., it may be changed when an organization's data loss prevention policies change, an organization may have different thresholds for different systems, etc.).

Alternatively, the probabilities may be combined with user context information in order to determine whether to protect the document. In one embodiment, at least one of sender data, recipient data, document author data, and document viewer data is combined with the probabilities in making the determination. In another embodiment, data including at least one of a group to which a sender belongs, a group to which a recipient belongs, a group to which a document author belongs, and a group to which a document viewer belongs is combined with the probabilities in making the determination.

If the document is to be protected, processing logic causes the document to be used in data loss detection (e.g., by adding the document to a data store of protected documents, creating a fingerprint of the document and sending it to the DMS and/or DMS agents, etc.) (block 408).

Figure 5:
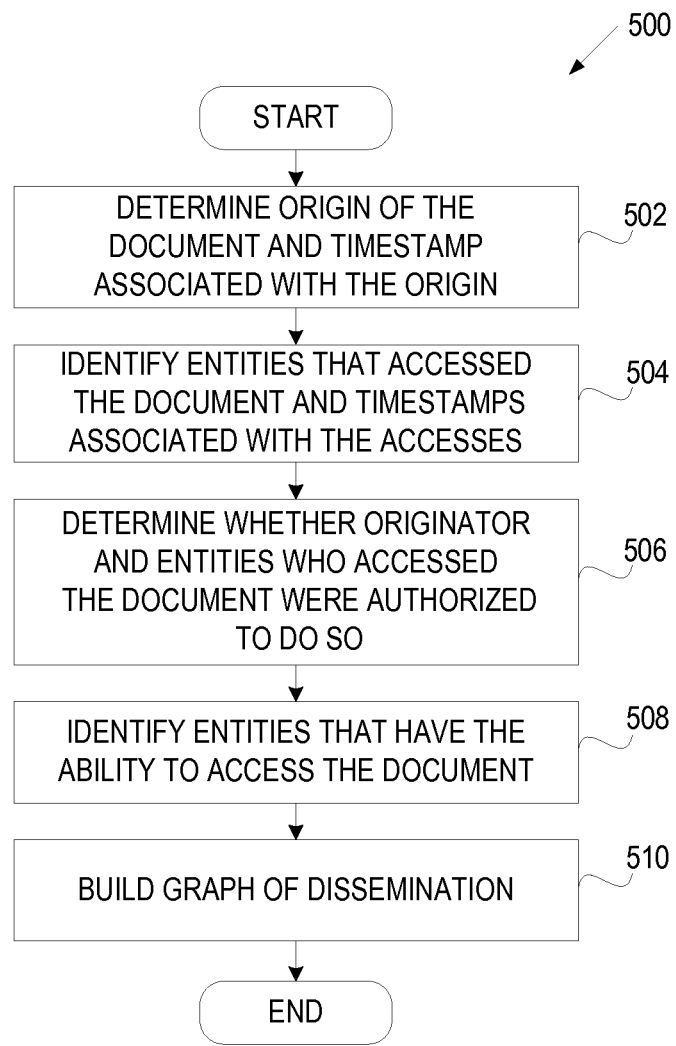
FIG. 5 is a flow diagram of one embodiment of a method for analyzing and graphing the dissemination of a document that is to be protected.

FIG. 5 is a flow diagram of one embodiment of a method 500 for analyzing and graphing the dissemination of a document that is to be protected. The method 500 is performed by processing logic that may comprise hardware (circuitry, dedicated logic, etc.), software (such as is run on a general purpose computer system or a dedicated machine), or a combination of both. In one embodiment, the method 500 is performed by a document monitoring system (e.g., document monitoring system 106).

Referring to FIG. 5, at block 502 processing logic determines the origin of the document and the timestamp associated with the origin. In one embodiment, this document may be a document that a sensitive document classifier has determined needs to be protected. The origin of the document may be the first user within the organization to create, receive, or access the document and the timestamp may be the time that this event occurred. In the case of an email message, for example, the user that created the email or first received the email message as well as the time when the email message was first sent or created would be determined.

At block 504, processing logic identifies entities that have accessed the document since the origin and a time stamp associated with the accesses. Entities who have accessed the document may be all users within the organization that have accessed, modified, copied or forwarded the document. It may also include users outside of the organization to whom the document has been transferred.

At block 506, processing logic determines whether the originator of the document and the entities who accessed the document were authorized to do so. Many times, the organization will be interested in both assessing the severity of a leak of sensitive information and in controlling the leak. Identifying which users that accessed the document were not authorized to do so may be instrumental in controlling a leak of sensitive information contained in the document.

At block 508, processing logic identifies entities that have the ability to access the document. For example, if the document is stored in a common data store, any user with access to the store could potentially access the document.

At block 510, processing logic builds a graph of the dissemination of the document. This graph may be built using the information collected at blocks 502 through 508.

FIG. 6 is an exemplary graphical representation of the dissemination of a protected document. The graphical representation traces the lifespan of the document within an organization. Each instance of a user accessing or possessing the document is denoted by a node in the graph. At node A (602), the document originates within the organization. In another embodiment, the graph may also include a timestamp of the origination. The document may have been created within the organization or received from an external source. The graph then traces the spread of the document through the organization. Points B (604) and C (606), for example, show two different users within the organization who accessed or possessed the document at two different points in time. The path between points B and C shows how the document spread from node B to node C. In the case of an email message, the message may have been forwarded by B and then passed along to several intermediate users before being received by user C. In an alternative embodiment, the graph may also indicate whether or not each entity that received or accessed the document was authorized to do so. This may be done by color-coding the nodes, marking the nodes, etc. The graph may also indicate users who currently have the ability to access the document.

Figure 7:
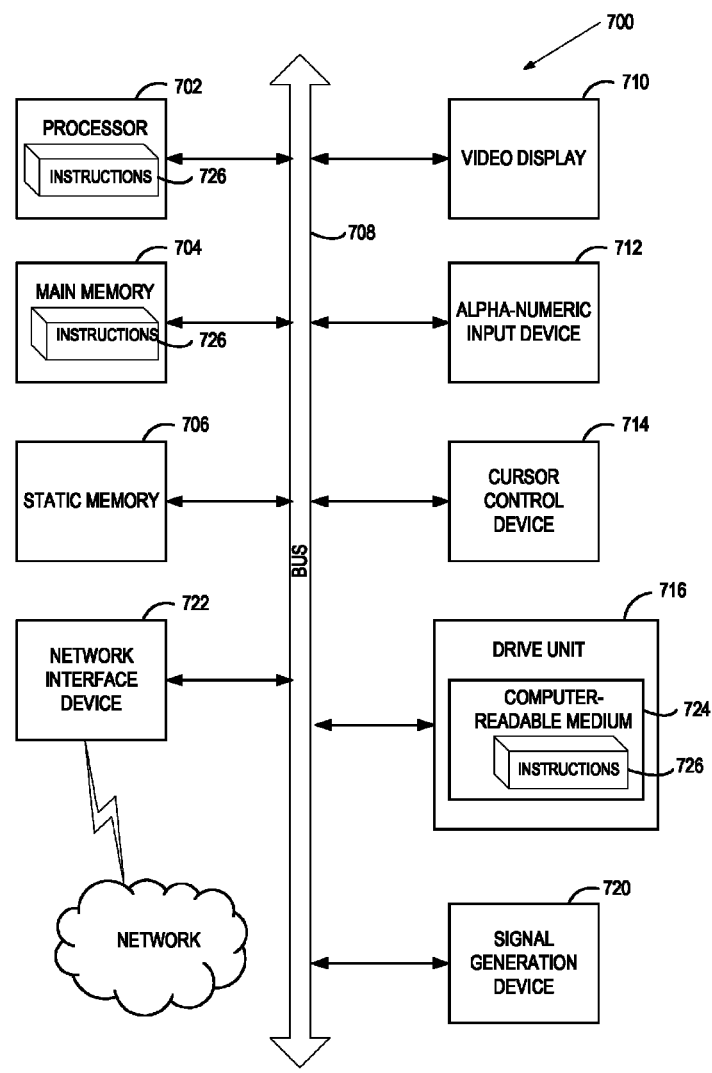
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 706.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions (e.g., software 726) embodying any one or more of the methodologies or functions described herein. The software 726 may also reside, completely or at least partially, within the main memory 704 and/or within the processor 702 during execution thereof by the computer system 700, the main memory 704 and the processor 702 also constituting computer-readable media. The software 726 may further be transmitted or received over a network 720 via the network interface device 722.

While the machine-accessible storage medium 724 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   determining one or more probabilities that a document belongs to one or more of a plurality of predefined categories;
   determining whether at least one of the one or more probabilities satisfies a first predetermined threshold;
   causing the document to be used in data loss detection when at least one of the one or more probabilities satisfies the first predetermined threshold;
   if at least one of the one or more probabilities does not satisfy the first predetermined threshold, determining, by a processor, whether at least one of the one or more probabilities satisfies a second predetermined threshold specific to a source of the document; and
   causing the document to be used in data loss detection when at least one of the one or more probabilities satisfies the second predetermined threshold.

2. The method of claim 1, wherein causing the document to be used in data loss detection when at least one of the one or more probabilities satisfies the second predetermined threshold comprises:
   receiving context data pertaining to the document; and
   confirming whether the document is to be protected using the context data.

3. The method of claim 2, wherein the context data comprises at least one of sender data, recipient data, document author data, or document viewer data.

4. The method of claim 1, wherein determining one or more probabilities that a document belongs to one or more of a plurality of predefined categories comprises:
   identifying a plurality of documents, each document in the plurality of documents being associated with at least one of the plurality of predefined categories; and
   creating a profile for each of the plurality of predefined categories using the plurality of documents.

5. The method of claim 1, wherein causing the document to be used in data loss detection when at least one of the one or more probabilities satisfies the second predetermined threshold comprises:
   determining whether at least one of the one or more probabilities exceeds a threshold accuracy value.

6. The method of claim 1, further comprising:
   analyzing dissemination of the document; and
   graphically illustrating the dissemination.

7. The method of claim 6, wherein analyzing dissemination of the document comprises:
   determining an origin of the document and a timestamp associated with the origin;
   identifying entities that accessed the document and timestamps associated with the accesses;
   determining whether an originator of the document and the entities that accessed the document are authorized to have access to the document; and
   identifying entities that have the ability to access the document.

8. The method of claim 7, wherein graphically illustrating the dissemination comprises:
   graphically indicating whether the originator and the entities that accessed the uncategorized document were authorized; and
   adding the entities that have the ability to access the document to the illustration of the dissemination.

9. A non-transitory computer readable storage medium that provides instructions, which when executed on a processor cause the processor to perform a method comprising:

determining one or more probabilities that a document belongs to one or more of a plurality of predefined categories;

determining whether at least one of the one or more probabilities satisfies a first predetermined threshold;

causing the document to be used in data loss detection when at least one of the one or more probabilities satisfies the first predetermined threshold;

if at least one of the one or more probabilities does not satisfy the first predetermined threshold, determining, by a the processor, whether at least one of the one or more probabilities satisfies a second predetermined threshold specific to a source of the document; and causing the document to be used in data loss detection when at least one of the one or more probabilities satisfies the second predetermined threshold.

10. The non-transitory computer readable storage medium of claim 9, wherein causing the document to be used in data loss detection when at least one of the one or more probabilities satisfies the second predetermined threshold comprises:

receiving context data pertaining to the document; and confirming whether the document is to be protected using the context data.

11. The non-transitory computer readable storage medium of claim 10, wherein the context data comprises at least one of sender data, recipient data, document author data, or document viewer data.

12. The non-transitory computer readable storage medium of claim 9, wherein determining one or more probabilities that a document belongs to one or more of a plurality of predefined categories, comprises:

identifying a plurality of documents, each document in the plurality of documents being associated with at least one of the plurality of predefined categories; and creating a profile for each of the plurality of predefined categories using the plurality of documents.

13. The non-transitory computer readable storage medium of claim 9, wherein causing the document to be used in data loss detection when at least one of the one or more probabilities satisfies the second predetermined threshold comprises:

determining whether at least one of the one or more probabilities exceeds a threshold accuracy value.

14. The non-transitory computer readable storage medium of claim 9, wherein the method further comprises:

analyzing dissemination of the document; and graphically illustrating the dissemination.

15. A system, comprising:

a memory; and a processor coupled with the memory to determine one or more probabilities that a document belongs to one or more of a plurality of predefined categories, determine whether at least one of the one or more probabilities satisfies a first predetermined threshold, cause the document to be used in data loss detection when at least one of the one or more probabilities satisfies the first predetermined threshold, if at least one of the one or more probabilities does not satisfy the first predetermined threshold, determine whether at least one of the one or more probabilities satisfies a second predetermined threshold specific to a source of the document, and cause the document to be used in data loss detection when at least one of the one or more probabilities satisfies the second predetermined threshold.

16. The system of claim 15, wherein the processor is to cause the document to be used in data loss detection when at least one of the one or more probabilities satisfies the second predetermined threshold by:

receiving context data pertaining to the document; and confirming whether the document is to be protected using the context data.

17. The system of claim 16, wherein the context data comprises at least one of sender data, recipient data, document author data, or document viewer data.

18. The system of claim 15, wherein the processor is to determine one or more probabilities that a document belongs to one or more of a plurality of predefined categories by:

identifying a plurality of categorized documents, each document in the plurality of documents being associated with at least one of the plurality of predefined categories; and creating a profile for each of the plurality of predefined categories using the plurality of documents.

19. The system of claim 15, wherein the processor is to cause the document to be used in data loss detection when at least one of the one or more probabilities satisfies the second predetermined threshold by:

determining whether at least one of the one or more probabilities exceeds a threshold accuracy value.

20. The system of claim 15, wherein the processor is further to:

analyze dissemination of the document; and graphically illustrate the dissemination.

\* \* \* \* \*